United States Patent
Kawachi et al.

(10) Patent No.: US 12,182,731 B2
(45) Date of Patent: Dec. 31, 2024

(54) ANOMALY DETECTION APPARATUS, ANOMALY DETECTION METHOD, AND PROGRAM

(71) Applicant: NIPPON TELEGRAPH AND TELEPHONE CORPORATION, Tokyo (JP)

(72) Inventors: Yuta Kawachi, Tokyo (JP); Yuma Koizumi, Tokyo (JP); Noboru Harada, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 993 days.

(21) Appl. No.: 17/260,956

(22) PCT Filed: Jul. 1, 2019

(86) PCT No.: PCT/JP2019/026027
§ 371 (c)(1),
(2) Date: Jan. 15, 2021

(87) PCT Pub. No.: WO2020/017285
PCT Pub. Date: Jan. 23, 2020

(65) Prior Publication Data
US 2021/0326728 A1    Oct. 21, 2021

(30) Foreign Application Priority Data
Jul. 20, 2018    (JP) .................................. 2018-136642

(51) Int. Cl.
*G06N 5/04*     (2023.01)
*G06N 20/00*    (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
(Continued)

(56) References Cited

U.S. PATENT DOCUMENTS

2016/0217378 A1* 7/2016 Bellala ................. G05B 23/024
2019/0026631 A1* 1/2019 Carr ....................... G06N 3/084
(Continued)

OTHER PUBLICATIONS

Ide et al., "Eigenspace-based anomaly detection in computer systems", KDD'04 (Year: 2004).*
(Continued)

*Primary Examiner* — Omar F Fernandez Rivas
*Assistant Examiner* — Shamcy Alghazzy

(57) ABSTRACT

A possible region of encoding results of anomalous samples is limited. An encoder storage unit 14 stores an encoder for projecting an input feature value into a latent space in which the latent space is a closed manifold, a normal distribution obtained by learning normal data and an anomalous distribution obtained by learning anomalous data are held on the manifold, and a decoder for reconstructing the output of the encoder. An encoding unit 15 obtains a reconstruction result output by the decoder when a feature value of target data is input to the encoder. An anomaly score calculation unit 16 calculates an anomaly score of the target data based on distances between the reconstruction result and the normal distribution and distances between the reconstruction result and the anomalous distribution.

16 Claims, 5 Drawing Sheets

(58) Field of Classification Search
USPC .......................................................... 706/12
See application file for complete search history.

(56) References Cited

U.S. PATENT DOCUMENTS

2019/0228312 A1* 7/2019 Andoni ............... G06F 18/2433
2019/0243872 A1* 8/2019 Komatsu ................ G06F 18/22

OTHER PUBLICATIONS

Kingma et al. (2013) "Auto-encoding variational bayes", arXiv preprint arXiv:1312.6114, 14 pages.
An et al. (2015) "Variational Autoencoder based Anomaly Detection using Reconstruction Probability", Technical Report, 18 pages.
Du et al. (2014) "A discriminative metric learning based anomaly detection method", IEEE Transactions on Geoscience and Remote Sensing, vol. 52, No. 11, pp. 6844-6857.

* cited by examiner

CALCULATION OF KL DIVERGENCE UPPER LIMIT VALUE

ACQUISITION OF RECONSTRUCTION RESULT

EXAMPLE OF TRAINING USING PRIOR DISTRIBUTION DIRECTION VECTOR [0, 0, 1]

EXAMPLE OF TRAINING USING PRIOR DISTRIBUTION DIRECTION VECTOR [1, 0, 0]

ANOMALY DETECTION APPARATUS, ANOMALY DETECTION METHOD, AND PROGRAM

CROSS-REFERENCE TO RELATED APPLICATIONS

This application is a U.S. 371 Application of International Patent Application No. PCT/JP2019/026027, filed on 1 Jul. 2019, which application claims priority to and the benefit of JP Application No. 2018-136642, filed on 20 Jul. 2018, the disclosures of which are hereby incorporated herein by reference in their entireties.

TECHNICAL FIELD

The present invention relates to an anomaly detection technique for identifying an anomalous state such as breakdown from an operation sound of a machine or the like.

BACKGROUND ART

From the viewpoint of continuity of business operation, it is important to forecast breakdown of a machine or the like before the breakdown, or to quickly discover the breakdown after the breakdown. As a method for saving labor on this, there is the field of anomaly detection for discovering "anomalies", which are divergences from a normal state, through electrical circuits, programs, or the like using a sensor or the like. In particular, the anomaly detection using a sensor that converts sound of a microphone or the like into electricity is called "anomalous sound detection".

Conventional representative anomalous sound detection is a technique in which data (hereinafter called "normal data") such as a sound waveform that is thought to be in a normal state in which breakdown or the like has not occurred is collected, a distribution followed by the normal data is derived using a regression model or the like, and anomaly is determined using, as the anomaly score, the value of the generation probability or the magnitude of the regression error with respect to a sample that is not known to be normal or anomalous. Examples include anomalous sound detection. (see Non-Patent Literature 2) using a reconstruction probability or a reconstruction error of a variational auto-encoder (see Non-Patent Literature 1).

When an anomalous sound detection system is put into practical use, in addition to normal data, it is possible to collect a very small amount of data such as a sound waveform that corresponds to an anomalous state such as a time of breakdown (hereinafter referred to as "anomalous data") in some cases. However, since the data amount is significantly biased between normal and anomalous, it is difficult to simply use the anomalous data in learning into an identification problem. A technique of performing manifold learning using both kinds of data (see Non-Patent Literature 3) and the like are examples of techniques for solving this problem.

CITATION LIST

Non Patent Literature

Non-Patent Literature 1: Kingma P Diederik and Max Welling, "Auto-encoding variational bayes", arXiv preprint arXiv:1312.6114, 2013.

Non-Patent Literature 2: An Jinwon and Sungzoon Cho, "Variational Autoencoder based Anomaly Detection using Reconstruction Probability", Technical Report, 2015.

Non-Patent Literature 3: Bo Du and Liangpei Zhang, "A discriminative metric learning based anomaly detection method", IEEE Transactions on Geoscience and Remote Sensing, vol. 52, no. 11, pp. 6844-6857, 2014.

SUMMARY OF THE INVENTION

Technical Problem

In general, in acoustic signal processing, a one-dimensional waveform is not treated as an input characteristic as-is, but high-dimensional acoustic features such as Mel-frequency cepstral coefficients (MFCCs) based on a discrete Fourier transform are often used. Various defects that occur in higher dimensions, which are called "curses of dimensionality", can be avoided by performing anomaly detection not in a feature value space of an original acoustic feature value or the like, but in a destination obtained by transcribing the feature value space using some projection function. When the dimension is lowered, an effect to reduce a calculation amount can also be expected. Accordingly, it is considered that an anomaly can be detected while avoiding defects at a scale such as the closeness to the center of results obtained by encoding feature values for unknown samples by using a variational auto-encoder having an encoder that projects a feature value into a low-dimensional latent space to perform learning such that normal features are collected near the center and anomalous features are kept away. However, if a latent space in a variational auto-encoder is a Euclidean space that can be infinitely positive and negative and a normal representative point is an origin or the like, the point that is the farthest from normal is an infinitely far point, and therefore an defect such as overflow occurs in processing on a computer due to the detection performance improving the closer an anomaly is to an infinitely far point.

In view of the foregoing technical problem, an object of the present invention is to limit the possible range of the encoding results of anomalous samples in anomaly detection using a variational auto-encoder, and thus avoid a computer defect such as overflow.

Means for Solving the Problem

In order to solve the above-described problem, an anomaly detection apparatus according to one aspect of the present invention includes: an encoder storage unit storing an encoder for projecting an input feature value into a latent space, and a decoder for reconstructing the output of the encoder, wherein the latent space is a closed manifold, and holds a normal distribution obtained by learning normal data and an anomalous distribution obtained by learning anomalous data on the manifold; an encoding unit that obtains a reconstruction result output by the decoder when the feature value of the target data is input to the encoder; and an anomaly score calculation unit that calculates an anomaly score of the target data based on distances between the reconstruction result and the normal distribution and distances between the reconstruction result and the anomalous distribution.

Advantageous Effects of the Invention

According to the present invention, the possible range of the encoding results of the anomalous samples is limited, and a computer defect such as overflow is less likely to occur.

DESCRIPTION OF EMBODIMENTS

Figure 1:
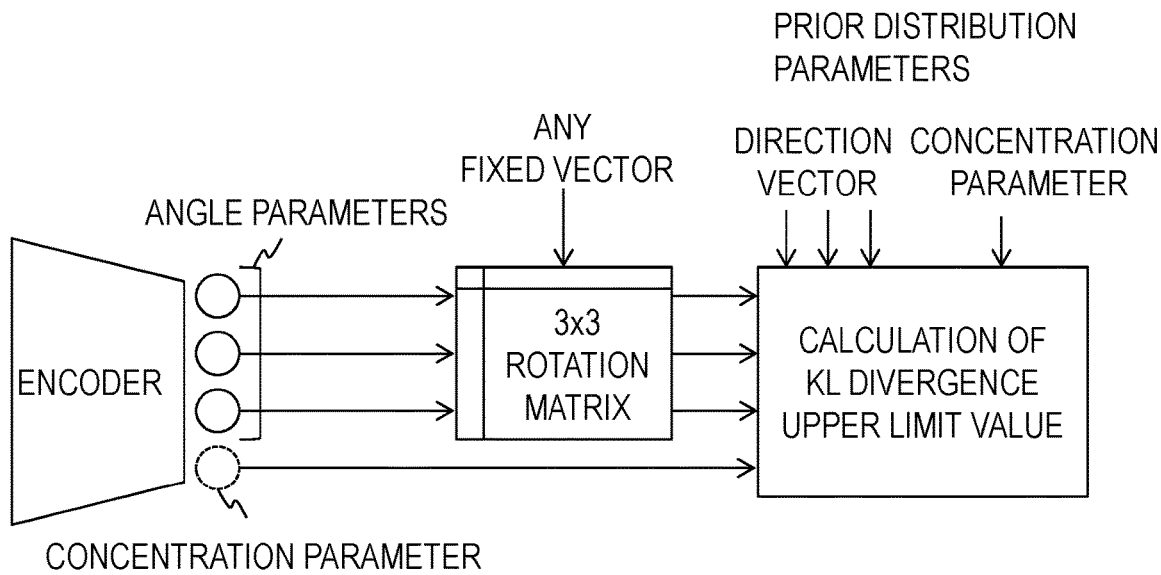
FIG. 1 is a diagram for illustrating learning processing of a variational auto-encoder.
Figure 1:
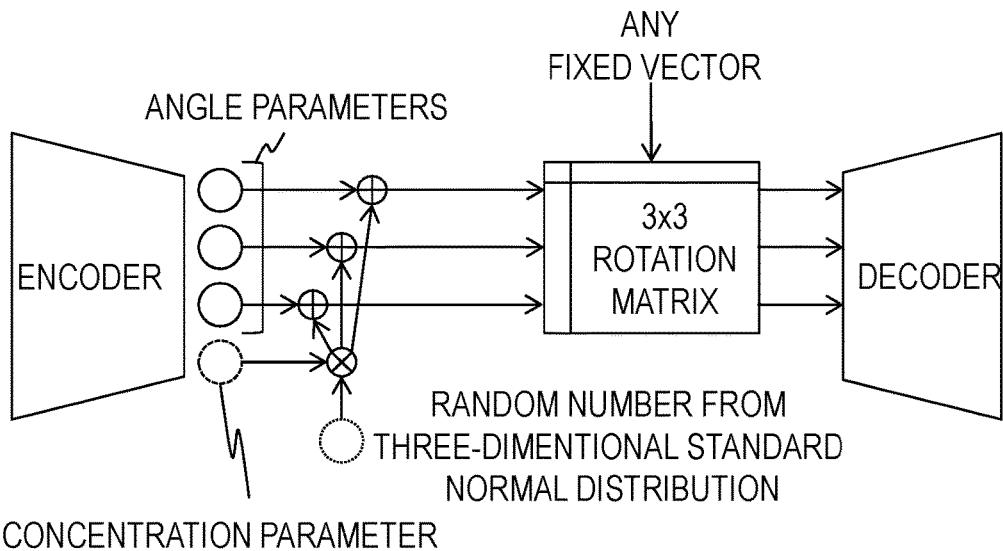

Hereinafter, an embodiment of the present invention will be described in detail. Note that in the drawings, components having the same functions are denoted by the same numbers, and redundant description thereof is omitted.

In the present invention, a case of projecting onto a closed manifold such as a hypersphere and not a conventional Euclidean space in variational auto-encoder learning is considered. Using two points on the manifold as normal and anomalous representative points, an anomaly is determined using a measure such as the closeness to those points. It is sufficient to set two points that are spaced the farthest apart from each other and correspond to the north pole and the south pole of the earth, for example, as the normal and anomalous representative points. The reason for using the latent space on the hypersphere is that the latent space on a hypersphere is finite, and therefore when learning advances to a certain extent, entire latent space can be filled with clustering destinations completely, and the target data can be reliably clustered to one of them. Also, if data that significantly deviates from the data used in training, that is, unknown data, appears, it is also possible to use the difference from a reconstruction pattern to find out that the data is unknown, because the latent space has been filled with known patterns completely.

With a variational auto-encoder, a multi-dimensional Gaussian distribution in a Euclidean space is used as a latent variable prior distribution. On a hypersphere, a von Mises-Fisher distribution corresponds thereto. An anomaly detection theory used when using a von Mises-Fisher distribution is following.

<Definition of Learning Reference>

If the latent space is a hypersphere, a von Mises-Fisher distribution is well-known as being easy to handle on a hypersphere and corresponding to a Gaussian distribution on a plane. If a prior distribution of a variational auto-encoder is a von. Mises-Fisher distribution, a KL divergence between the posterior distribution and the prior distribution needs to be obtained. Although it is difficult to obtain this analytically, since the upper limit value has already been obtained (see Reference Document 1), the upper limit value may be used instead.

[Reference Document 1] Diethe, Tom, "A Note on the Kullback-Leibler Divergence for the von Mises-Fisher distribution", arXiv preprint arXiv:1502.07104, 2015.

<Model Structure>

It is predicted that the von Mises-Fisher distribution will not have a relationship that can be converted into another probability distribution, as with a Gaussian distribution (see Reference Document 2). Accordingly, a similar model structure as that of a variational auto-encoder using a multi-dimensional Gaussian distribution cannot be acquired by plainly using a so-called Reparametrization Trick. Then, two structures to avoid this problem are used. For example, this problem is avoided by switching the structure according to the progress to which learning has advanced.

[Reference Document 2] T. Yotsuji, "Method for generating random numbers in a probability distribution for a computer simulation", p. 396, 2013

<<Scheme for Fixing Concentration Parameters (Scheme 1)>>

It is assumed that an encoder outputs angle parameters and a concentration parameter in a latent space. In this scheme, the concentration parameter output by the encoder is ignored. For example, canonical Euler angles or the like are used in the expression of the angles. Clipping or the like may also be used to fit into a range of −180 degrees to +180 degrees or −90 degrees to +90 degrees, such that the output variables fall within the range. A rotation matrix is constructed using the output angle parameters. This rotation matrix is multiplied by a value obtained using a random number generated from the von Mises-Fisher distribution that has a desired direction vector (parameter) and an appropriate concentration parameter and is a latent variable prior distribution. The direction parameter of the prior distribution may be a direction of a point representing normality or anomaly, and the concentration parameter may be any constant. Accordingly, since a random number centered about the direction output by the encoder and not the direction set in the prior distribution is obtained, the variational auto-encoder is constructed by inputting that into the decoder. Learning using a gradient can be performed similarly to a normal variational auto-encoder by constructing the above-described processing using a calculation graph.

<<Scheme for Approximating Distribution of Concentration Parameters Using Gaussian Distribution (Scheme 2)>>

It is assumed that an encoder outputs angle parameters and a concentration parameter in a latent space, similarly to Scheme 1. A method is conceivable in which learning is performed using a normal random number since it is predicted that the von Mises-Fisher distribution can be considered a Gaussian distribution if the concentration parameter is Large (see Reference Document 3). First, a random number is generated from a multivariate standard normal distribution in which the number of dimensions is the same as that of the angle parameters, the average is a zero vector, and the variance-covariance matrix is a unit matrix. This random number is multiplied by a value obtained by converting a concentration parameter output from the encoder according to a certain rule (indicates conversion into a standard deviation equivalent of a Gaussian distribution using a relation such as the concentration parameter corresponding to the inverse of the variance of the Gaussian distribution, or the like). The product of this multiplication is added to the angle parameters output from the encoder. Conversely, a scalar value output by the encoder may also be treated as a logarithmic variance of a Gaussian distribution or the like, and in this case, in order to convert into the concentration parameter that is to be given to the KL divergence term, it is sufficient to perform conversion such as finding the inverse after finding the exponent of the value. This processing may be used together with clipping similar to that of Scheme 1, and the clipping may be performed before or after the processing. A rotation matrix is constituted by vectors obtained in this manner, and when this rotation matrix is multiplied by a fixed vector (may have any length, but one is used for simplicity) having any value in common overall, vectors on a unit hypersphere are obtained. By inputting the vectors on the unit hypersphere to the decoder, it is possible to construct a variational auto-encoder. The details of the rest of the scheme are the same as in Scheme 1. The above-described processing is shown in FIG. 1.

Figure 2A:
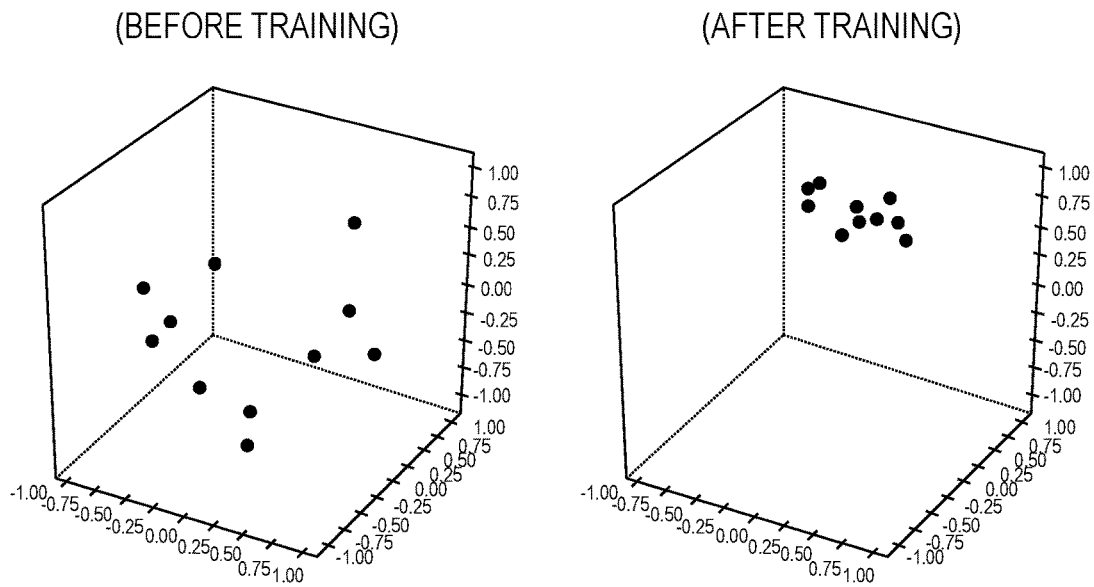
FIG. 2 is a conceptual diagram visualizing encoding results of a variational auto-encoder.
Figure 2B:
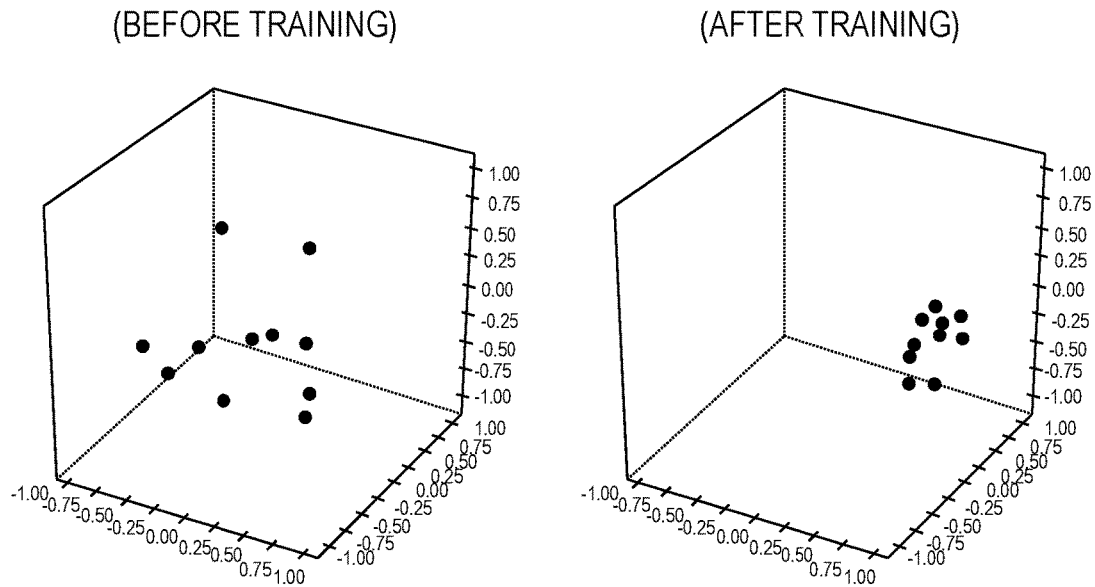

FIG. 2 shows a concept of projection into a latent space when training using one prior distribution. FIG. 2A is a conceptual diagram visualizing a latent space of encoding results of a closed manifold auto-encoder used when training using [0,0,1] as the direction parameter of the prior distribution (the left side shows a state prior to training, and the right side shows a state after training). FIG. 2B is a conceptual diagram visualizing a latent space of encoding results of a closed manifold auto-encoder used when training using [1,0,0] as the direction parameter of the prior distribution (the left side shows a state prior to training, and the right side shows a state after training).

<<Simple Implementation of Scheme 2>>

Figure 3:
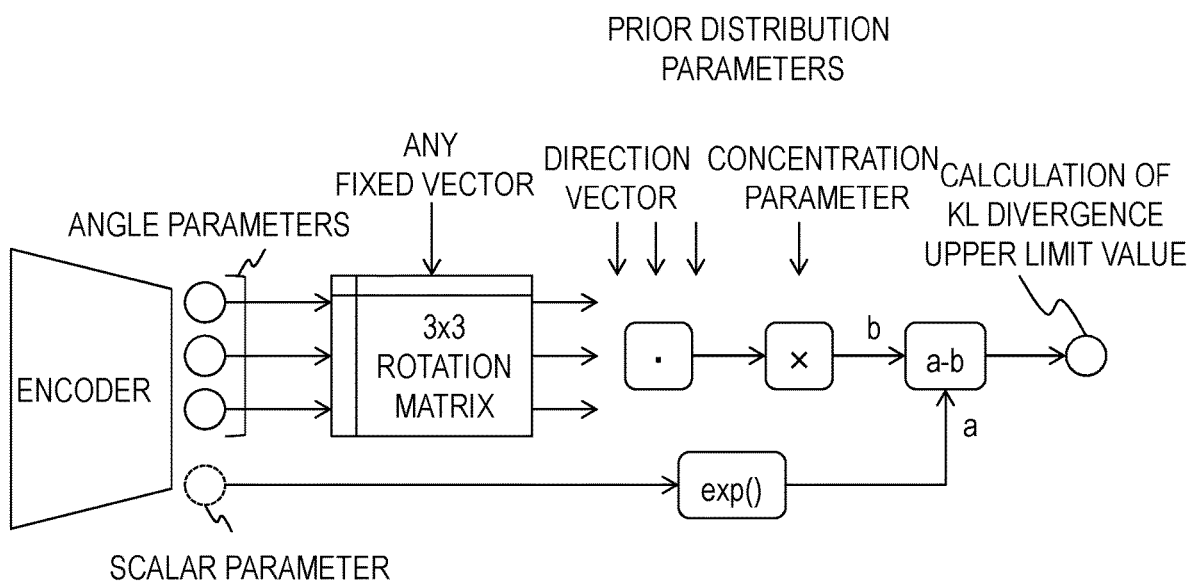
FIG. 3 is a diagram for illustrating a simple implementation of a variational auto-encoder.

In Scheme 2, the following heuristics may also be adopted in order to simplify calculation of the KL divergence value. First, angle parameters of the latent dimensional number (e.g., 3) and a scalar parameter corresponding to the logarithmic variance of a Gaussian distribution are output from the encoder. The rotation matrix is formed from the angle parameters, and a vector on a unit hypersphere is obtained by multiplying the rotation matrix by a fixed vector having any value in common overall. The inner product of the vector on the unit hypersphere and the vector on the unit hypersphere (prior distribution direction vectors) representing normality or anomaly of the prior distribution provided in advance is found, and is used as the degree of similarity with the prior distribution direction vector. A prior distribution concentration value (e.g., 1) of the prior distribution provided in advance is multiplied by the degree of similarity. Finally, this value is subtracted from a value obtained by finding the exponent of the scalar parameter (may be a factor of any constant) from the encoder, and the resulting value may also be used instead of the original KL divergence cost. Specifically, this state is as shown in FIG. 3.

<<Method for Combining Two Schemes>>

It is assumed that in an initial period of learning in which a neural network parameter is a random number or a number close thereto, Scheme 1, which is a scheme with a fixed concentration parameter, is suitable since it is possible to achieve a distribution in which the projection destination in the latent space expands thinly on the manifold. It is considered that if training has advanced to a certain extent, clusters that correspond to normality and anomaly will be formed in the latent space. In such a situation, that is, a situation in which it is considered that the distribution of the projection result has narrowed to a certain extent, it is considered that the concentration parameter is large, and it is considered that Scheme 2 is suitable. Accordingly, it is considered that a method is suitable in which learning is started from a network having a random number parameter, learning is performed using Scheme 1 at first, and when learning has advanced to a certain extent, for example, the number of epochs (number of rounds of learning data) or the like is determined in advance, and Scheme 2 is switched to.

The summary of the reason for performing learning using two schemes follows. The conventional variational auto-encoder uses a Gaussian distribution as the latent variable prior distribution. However, if a hypersphere is used as the latent variable prior distribution, a Gaussian distribution cannot be handled. For this reason, through Scheme 1, the axis is fixed and the hypersphere can be treated as a two-dimensional space. Since a Gaussian distribution can be handled through this scheme, it is assumed that learning is performed thereafter using Scheme 2.

<Avoidance of Gimbal Lock Phenomenon>

It is known that if there is output close to 90 degrees, a defect called "gimbal lock" will occur. In order to avoid this, a cost function having a high value with respect to 90 degrees or a value close thereto is set for the angle parameters so as to avoid 90 degrees, and the cost may be added through addition or the like to the loss function.

Embodiment

Figure 4:
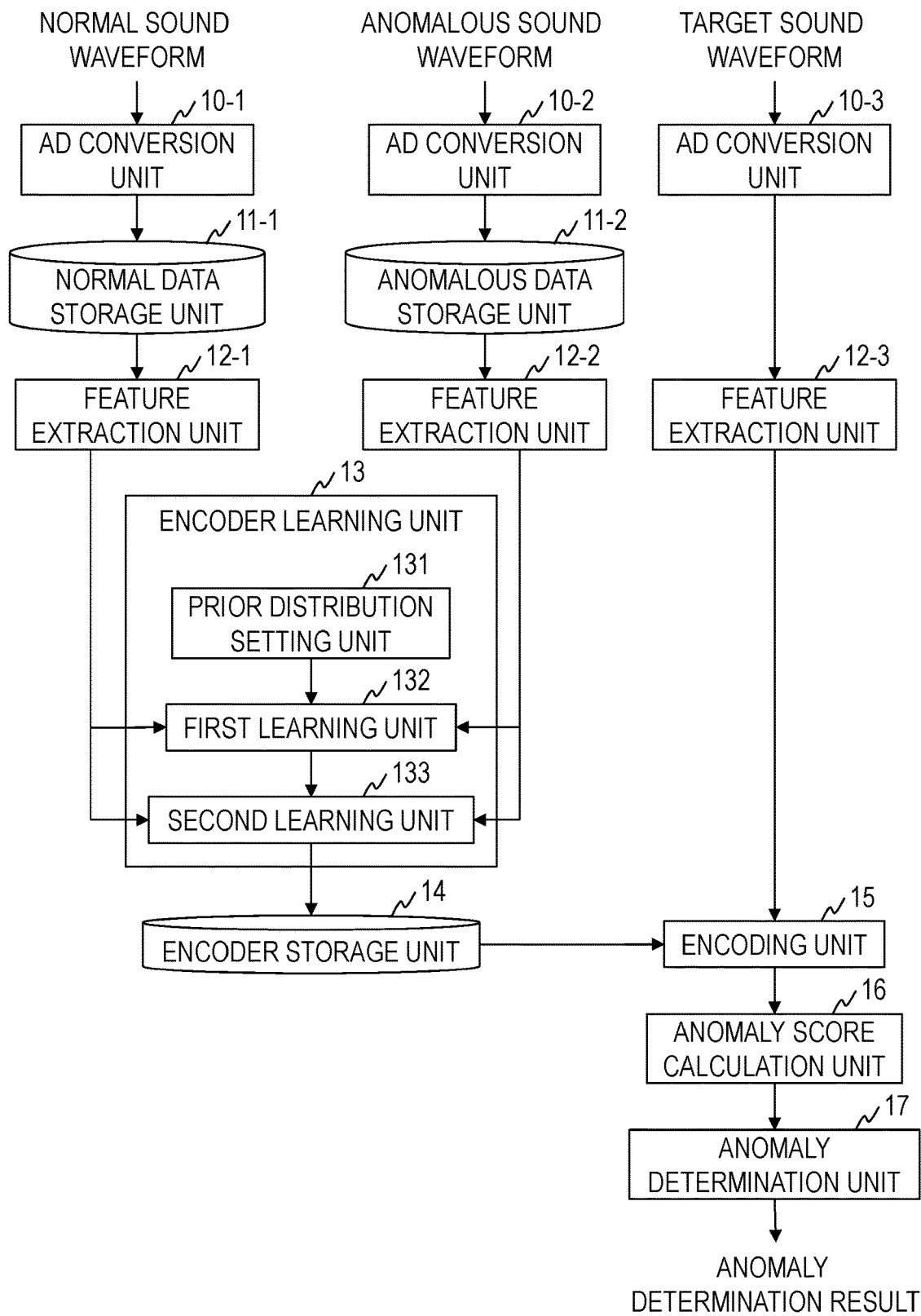
FIG. 4 is a diagram illustrating a functional configuration of an anomaly detection apparatus.

The anomaly detection apparatus and method of an embodiment learns a variational auto-encoder: using learning data composed of normal data and anomalous data, and outputs an anomaly determination result indicating whether input data that is to be subjected to anomaly detection is normal or anomalous using the variational auto-encoder. As shown in FIG. 4, the anomaly detection apparatus of the embodiment includes three AD conversion units 10-1 to 10-3, a normal data storage unit 11-1, an anomalous data storage unit 11-2, three feature extraction units 12-1 to 12-3, an encoder learning unit 13, an encoder storage unit 14, an encoding unit 15, an anomaly score calculation unit 16, and an anomaly determination unit 17. Furthermore, the encoder learning unit 13 includes a prior distribution setting unit 131, a first learning unit 132, and a second learning unit 133. The anomaly detection method of the embodiment is realized by this anomaly detection apparatus performing processing of the steps illustrated in FIG. 5.

The anomaly detection apparatus is a special apparatus that is constituted by, for example, a special program being loaded into a known or dedicated computer including a central processing unit (CPU), a main storage apparatus (RAM: random access memory), and the like. The anomaly detection apparatus executes the steps of processing based on, for example, control performed by the central processing unit. The data input to the anomaly detection apparatus and the data obtained through the steps of processing is stored in, for example, the random access memory, and the data stored in the random access memory is read out to the central processing unit as needed and is used in other processing. At least a portion of the processing units of the anomaly detection apparatus may also be constituted by hardware such as an integrated circuit. The storage units included in the anomaly detection apparatus can be constituted by, for example, a main storage apparatus such as a RAM (Random Access Memory), an auxiliary storage apparatus constituted by a semiconductor memory element such as a hard disk, an optical disc, or a flash memory, or middleware such as a relational database or a key value store.

Figure 5:
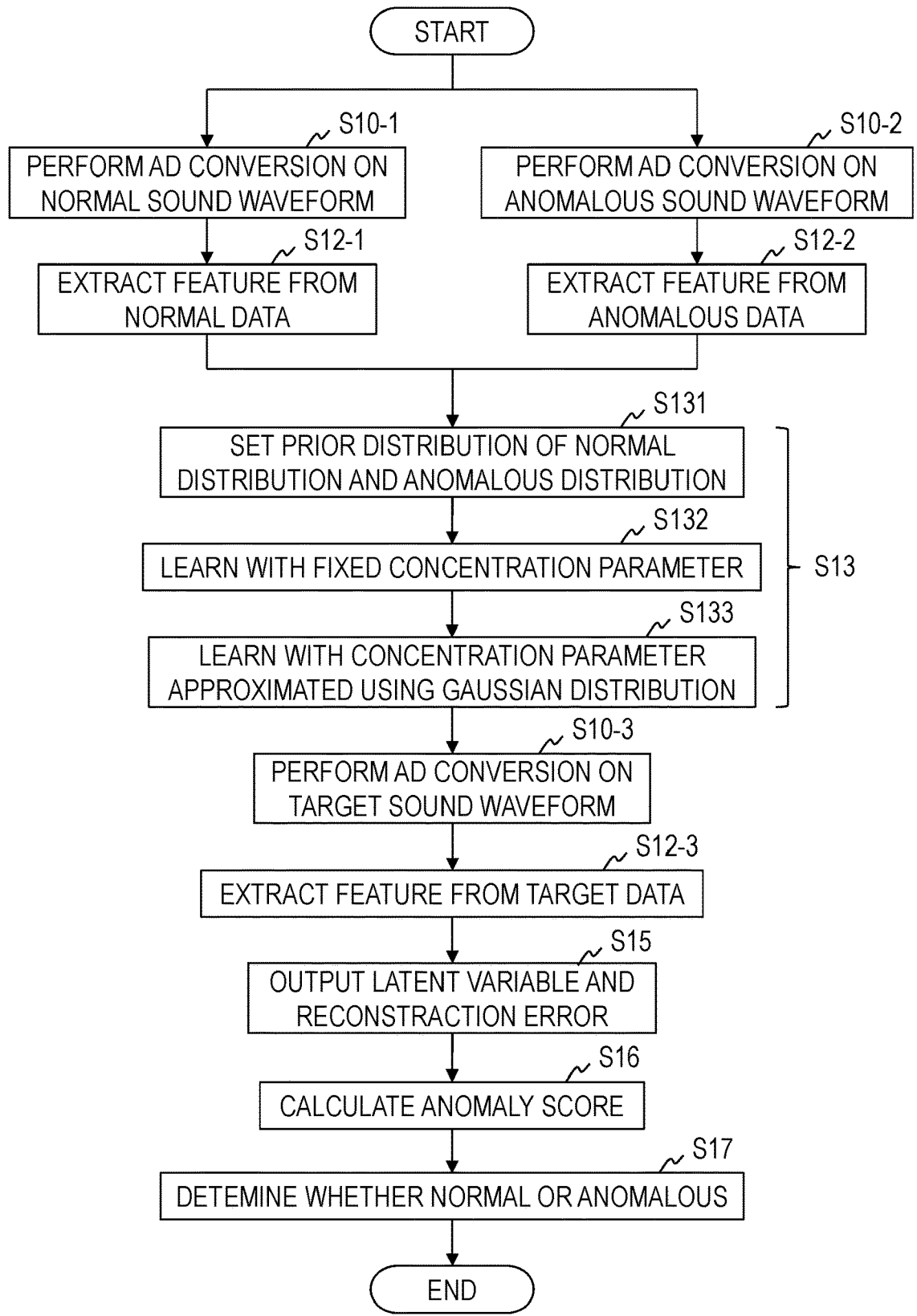
FIG. 5 is a diagram illustrating a processing procedure for an anomaly detection method.

Hereinafter, an anomaly detection method executed by the anomaly detection apparatus of the embodiment will be described with reference to FIG. 5.

In step S10-1, the AD conversion unit 10-1 uses a predetermined sampling frequency to convert, from analog to digital, a sound waveform (hereinafter referred to as a "normal sound waveform") such as a normal operation sound of a machine or the like that is to be subjected to anomaly detection, and thus generates quantized waveform data (hereinafter referred to as "normal data"). The AD conversion unit 10-1 stores the generated normal data in the normal data storage unit 11-1.

In step S10-2, the AD conversion unit 10-2 uses a predetermined sampling frequency to convert, from analog to digital, a sound waveform (hereinafter referred to as an "anomalous sound waveform") such as a breakdown sound of a machine or the like that is to be subjected to anomaly detection, and thus generates quantized waveform data (hereinafter referred to as "anomalous data"). The AD conversion unit 10-2 stores the generated anomalous data in the anomalous data storage unit 11-2.

In step S12-1, the feature extraction unit 12-1 extracts a feature value from the normal data stored in the normal data storage unit 11-1. In the feature value extraction, the waveform data may also be treated as-is as data obtained by aligning one-dimensional values chronologically, and the feature value extraction may also be performed through feature extraction processing for expanding into multiple dimensions using joining of multiple samples, a discrete Fourier transform, filter bank processing, or the like, or by, for example, normalizing the space taken up by the value by calculating the average or the variance of the data. The feature extraction unit 12-1 outputs the extracted feature value of the normal data to the encoder learning unit 13.

In step S12-2, the feature extraction unit 12-2 extracts a feature value from the anomalous data stored in the anomalous data storage unit 11-2. Extraction of the feature value is performed similarly to that performed by the feature extraction unit 12-1. The feature extraction unit 12-2 outputs the extracted feature value of the anomalous data to the encoder learning unit 13.

In step S13, the encoder learning unit 13 sequentially executes the prior distribution setting unit 131, the first learning unit 132, and the second learning unit 133, and learns a single variational auto-encoder so as to reconstruct the normal data and the anomalous data. The encoder learning unit 13 stores the learned variational auto-encoder in the encoder storage unit 14.

In step S131, the prior distribution setting unit 131 of the encoder learning unit 13 sets two different distributions on a closed manifold as a latent variable prior distribution of the normal data and a latent variable prior distribution of the anomalous data. For example, if the latent space is sphere-shaped, the parameters expressing the centers of the von Mises-Fisher distributions are placed at the points farthest from each other on the sphere surface, and it is sufficient that the concentration parameter is set to a predetermined constant (e.g., 1).

In step S132, the first learning unit 132 of the encoder learning unit 13 performs learning through the above-described scheme for fixing concentration parameters (Scheme 1) using the learning data composed of the feature value of the normal data output by the feature extraction unit 12-1 and the feature value of the anomalous data output by the feature extraction unit 12-2.

In step S133, the second learning unit 133 of the encoder learning unit 13 performs learning through the above-described scheme for approximating the distribution of concentration parameters with a Gaussian distribution (Scheme 2) using the learning data composed of the feature value of the normal data output by the feature extraction unit 12-1 and the feature value of the anomalous data output by the feature extraction unit 12-2.

In steps S132 and S133, the normal data and the anomalous data may be learned alternatingly, or the normal data and the anomalous data may be included in one batch processing and learned such that the sum of their respective losses when the prior distribution for the normal data and the prior distribution for the anomalous data are set is minimized.

In step S10-3, the AD conversion unit 10-3 uses a predetermined sampling frequency to convert, from analog to digital, a sound waveform (hereinafter referred to as a "target sound waveform") such as an operation sound of a machine or the like that is to be subjected to anomaly detection, and thus generates quantized waveform data (hereinafter referred to as "target data"). The AD conversion unit 10-3 outputs the generated target data to the feature extraction unit 12-3.

In step S12-3, the feature extraction unit. 12-3 extracts a feature value from the target data output by the AD conversion unit 10-3. Extraction of the feature value is performed similarly to that performed by the feature extraction unit 12-1. The feature extraction unit 12-3 outputs the extracted feature value of the target data to the encoding unit 13.

In step S15, the encoding unit 15 inputs the feature value of the target data output by the feature extraction unit 12-3 to the learned variational auto-encoder stored in the encoder storage unit 14, and obtains a reconstruction result including at least a latent variable vector and a reconstruction error. The encoding unit 15 outputs the obtained reconstruction result to the anomaly score calculation unit 16.

In step S16, the anomaly score calculation unit 16 calculates the anomaly score of the target data based on the reconstruction result output by the encoding unit 15. The anomaly score is defined using the closeness to the prior distribution for the normal data in the latent space or the prior distribution for the anomalous data. Put simply, it is sufficient to use the ratio of the closenesses to the positions of the respective prior distributions, or the like. The closeness may be defined by the Euclidean length, and the upper limit value of the KL divergence used in the loss function may also be used there as. Also, the closeness may be combined with another index using any method, such as forming the anomaly score by combining the closeness with the reconstruction error using addition or the like. The anomaly score calculation unit 16 outputs the calculated anomaly score of the target data to the anomaly determination unit 17.

In step S17, the anomaly determination unit 17 determines whether the machine or the like that is subjected to the anomaly detection is in a normal state or an anomalous state based on the anomaly score of the target data output by the anomaly score calculation unit 16, and outputs the anomaly determination result indicating normality or anomaly. In the determination of whether the machine or the like is in a normal state or an anomalous state, for example, the anomaly score of the target data need only be compared to a predetermined threshold value, and the state need only be determined as normal if the anomaly score is less than a threshold value and anomalous if the anomaly score is greater than or equal to the threshold value.

In the present invention, the anomaly detection using the variational auto-encoder is constructed as follows. The latent space is a closed manifold, and the latent variable prior distribution is a probability distribution on a closed manifold. Two latent variable prior distributions that respectively correspond to normality and anomaly are set, and a single model is updated using both normal and anomalous data. With respect to this model, anomaly detected using information indicating which distribution the encoder output of an unknown sample is closer to. By using this kind of configuration, according to the present invention, the possible range of the encoding results the anomalous, samples is limited, and as result, a computer defect such as overflow is less likely to occur.

The present invention can be applied similarly also to any anomaly detection domain using any sensor data other than sound, such as temperature, pressure, or displacement, or traffic data such as a network communication amount as a target.

Although an embodiment of the present invention was described above, the specific configuration is not limited to these embodiments, and it goes without saying that the present invention encompasses appropriate changes in design and the like without departing from, the gist of the present invention. Various types of processing described in the embodiment are not only executed chronologically according to the order which they were described, but may also be executed separately or in parallel according to need or the processing capability of the apparatus executing the processing.

[Program, Storage Apparatus]

If various processing functions of the apparatuses described in the above-described embodiment are realized by a computer, the content of the processing of the functions to be included in the apparatuses is described by the program. Also, due to the program being executed by a computer, the various processing functions of the above-described apparatuses are realized on the computer.

The program describing the content of the processing can be stored in a computer-readable storage medium. For example, it is possible to use any kind of computer-readable storage medium, such as a magnetic recording apparatus, an optical disc, a magneto-optical recording medium, or a semiconductor memory.

Also, distribution of the program is performed through, for example, sale, transfer, lending, or the like of a portable recording medium such as a DVD or a CD-ROM on which the program is recorded. Furthermore, it is also possible to use a configuration in which the program is distributed by storing the program in a storage apparatus of a server computer and transferring the program from the server computer to another computer via a network.

For example, the computer that executes this kind of program first stores the program recorded on the portable recording medium or the program transferred from the server computer in a storage apparatus of the computer. Then, during execution of the processing, the computer loads the program stored in the storage apparatus of the computer and executes the processing in accordance with the loaded program. Also, as another mode of executing the program, the computer may directly load the program from a portable recording medium and execute processing in accordance with the program, and may further sequentially execute processing in accordance with the received program every time a program is transferred from the server computer to the computer. It is also possible to use a configuration in which transfer of the program from the server computer to the computer is not performed, and the above-described processing is executed through a so-called ASP (Application Service Provider) type of service that, realizes the processing function through only an execution instruction and result acquisition. Note that it is assumed that the program of the present mode includes information that is provided for processing performed by an electronic computer, which is information conforming to a program (data that is not a direct command to a computer, but has a property that defines the processing of the computer, etc.).

Also, in this mode, the present apparatus is configured by causing the computer to execute a predetermined program, but at least a portion of the processing content may also be realized by hardware.

REFERENCE SIGNS LIST 10-1, 10-2, 10-3 AD conversion unit
11-1 Normal data storage unit
11-2 Anomalous data storage unit
12-1, 12-2, 12-3 Feature extraction unit
13 Encoder learning unit
131 Prior distribution setting unit
132 First learning unit
133 Second learning unit
14 Encoder storage unit
15 Encoding unit
16 Anomaly score calculation unit
17 Anomaly determination unit

What is claimed is:

1. An anomaly detection apparatus, comprising:
a storage configured to store a neural network comprising an encoder for projecting an input feature value into a latent space, and a decoder for reconstructing the output of the encoder, wherein the latent space is a closed manifold, and holds a normal distribution obtained by learning normal data and an anomalous distribution obtained by learning anomalous data on the manifold; and
a processor configured to:
obtain a reconstruction result output by the decoder when a feature value of target data is input to the encoder, wherein the target data represents operation data of a machine as waveform data processed by a sensor; and
calculate an anomaly score of the target data based on distances between the reconstruction result and the normal distribution and distances between the reconstruction result and the anomalous distribution,
wherein the encoder outputs angle parameters and a concentration parameter, and the processor is further configured to:
set two different distributions on the manifold as a prior distribution of the normal distribution and a prior distribution of the anomalous distribution;
learn the normal distribution and the anomalous distribution with the concentration parameter set to a predetermined constant, among the outputs of the encoder obtained when a feature value of learning data composed of the normal data and the anomalous data is input; and
learn the normal distribution and the anomalous distribution by using a KL divergence upper limit value, wherein the KL divergence upper limit value is calculated based on a vector obtained by multiplying a rotation matrix and a fixed vector having any value in common overall, a direction vector of the prior distribution, and a concentration parameter of the prior distribution; and the rotation matrix is constituted by the angle parameters output by the encoder when a feature value of the learning data is input, and is constructed using vectors obtained by adding a value obtained by multiplying a random number generated from a Gaussian distribution and a value obtained by converting the concentration parameter output by the encoder when the feature value of the learning data is input into a standard deviation equivalent of a Gaussian distribution, to the angle parameters output by the encoder; and determine, based on the calculated anomaly score of the target data and a predetermined threshold, an anomalous state of operation of the machine.

2. The anomaly detection apparatus according to claim 1, wherein after the learning of the normal distribution and the anomalous distribution by the third processing circuitry using the learning data is executed a predetermined number of times, the learning of the normal distribution and the anomalous distribution by the fourth processing circuitry using the learning data is executed.

3. The anomaly detection apparatus according to claim 1, wherein in the encoder, a cost function having a high value for a value near 90 degrees is set for the angle parameters.

4. The anomaly detection apparatus according to claim 1, wherein the latent space is a hypersphere, and the normal distribution and the anomalous distribution are von Mises-Fisher distributions.

5. The anomaly detection apparatus according to claim 1, the processor further configured to execute operations comprising:

receive first waveform data as the target data from the sensor;

receive second waveform data as the normal data; and receive third waveform data as the anomalous data.

6. The anomaly detection apparatus according to claim 5, wherein the first waveform data represent an operation sound of a machine, the second waveform data represent a normal operation sound of the machine, and the third waveform data represent an anomalous operation sound of the machine.

7. The anomaly detection apparatus according to claim 1, the processor further configured to:

receive first waveform data as the target data from the sensor, wherein the sensor converts the operation data of the machine into the first waveform data; and determine, based on the calculated anomaly score of the target data, an anomalous state of operation of the machine.

8. The anomaly detection apparatus according to claim 1, wherein the first waveform data represents a type of the operation data of the machine, and the type of the operation data is one of: sound, temperature, pressure, displacement, or traffic data.

9. An anomaly detection apparatus comprising:

a neural network comprising: an encoder for projecting an input feature value into a latent space, and a decoder for reconstructing the output of the encoder, wherein the latent space is a closed manifold and holds a normal distribution obtained by learning normal data and an anomalous distribution obtained by learning anomalous data on the manifold; and a processor configured to:

obtain a reconstruction result output by the decoder when a feature value of target data is input to the encoder, wherein the target data represents operation data of a machine as waveform data processed by a sensor; and calculate an anomaly score of the target data based on distances between the reconstruction result and the normal distribution and distances between the reconstruction result and the anomalous distribution, wherein the encoder outputs angle parameters and a scalar parameter corresponding to a logarithmic variance of a Gaussian distribution, and the processor further configured to:

set two different distributions on the manifold as a prior distribution of the normal distribution and a prior distribution of the anomalous distribution;

learn the normal distribution and the anomalous distribution with the concentration parameter set to a predetermined constant among the outputs of the encoder obtained when a feature value of learning data composed of the normal data and the anomalous data is input; and learn the normal distribution and the anomalous distribution by obtaining vectors on a unit hyperplane that are the result of multiplying a rotation matrix and a fixed vector having any value in common overall, multiplying the concentration parameter of the prior distribution by the inner product of the vectors on the unit hyperplane and the direction vector of the prior distribution, subtracting the resulting value from an exponent of the scalar parameter output by the encoder when the feature value of the learning data is input, and setting the resulting value as a KL divergence value, wherein the rotation matrix is constituted by the angle parameters output by the encoder when a feature value of the learning data is input, and is constructed using vectors obtained by adding a value obtained by multiplying a random number generated from a Gaussian distribution by the scalar parameter output by the encoder when the feature value of the learning data is input, to the angle parameters output by the encoder; and determine, based on the calculated anomaly score of the target data and a predetermined threshold, an anomalous state of operation of the machine.

10. The anomaly detection apparatus according to claim 9, wherein after the learning of the normal distribution and the anomalous distribution by the third processing circuitry using the learning data is executed a predetermined number of times, the learning of the normal distribution and the anomalous distribution by the fourth processing circuitry using the learning data is executed.

11. The anomaly detection apparatus according to claim 9, wherein in the encoder, a cost function having a high value for a value near 90 degrees is set for the angle parameters.

12. The anomaly detection apparatus according to claim 9, wherein after the learning of the normal distribution and the anomalous distribution by the third processing circuitry using the learning data is executed a predetermined number of times, the learning of the normal distribution and the anomalous distribution by the fourth processing circuitry using the learning data is executed.

13. The anomaly detection apparatus according to claim 9, wherein in the encoder, a cost function having a high value for a value near 90 degrees is set for the angle parameters.

14. The anomaly detection apparatus according to claim 9, wherein the latent space is a hypersphere, and the normal distribution and the anomalous distribution are von Mises-Fisher distributions.

15. An anomaly detection method comprising:

storing, in a storage of an anomaly detection apparatus, a neural network comprising an encoder for projecting an input feature value into a latent space, and a decoder for reconstructing the output of the encoder, wherein the latent space is a closed manifold, and holds a normal distribution obtained by learning normal data and an anomalous distribution obtained by learning anomalous data on the manifold, the encoder outputs angle parameters and a concentration parameter, and;

obtaining, by a reconstruction result output by the decoder when a feature value of target data is input to the encoder, wherein the target data represents operation data of a machine as waveform data processed by a sensor; and calculating, by an anomaly score of the target data based on distances between the reconstruction result and the normal distribution and distances between the reconstruction result and the anomalous distribution, setting, two different distributions on the manifold as a prior distribution of the normal distribution and a prior distribution of the anomalous distribution;

learning, the normal distribution and the anomalous distribution with the concentration parameter set to a predetermined constant, among the outputs of the encoder obtained when a feature value of learning data composed of the normal data and the anomalous data is input; and learning, the normal distribution and the anomalous distribution by using a KL divergence upper limit value, wherein the KL divergence upper limit value is calculated based on a vector obtained by multiplying a rotation matrix and a fixed vector having any value in common overall, a direction vector of the prior distribution, and a concentration parameter of the prior distribution; and the rotation matrix is constituted by the angle parameters output by the encoder when a feature value of the learning data is input, and is constructed using vectors obtained by adding a value obtained by multiplying a random number generated from a Gaussian distribution and a value obtained by converting the concentration parameter output by the encoder when the feature value of the learning data is input into a standard deviation equivalent of a Gaussian distribution, to the angle parameters output by the encoder; and determining based on the calculated anomaly score of the target data and a predetermined threshold, an anomalous state of operation of the machine.

16. A non-transitory computer-readable recording medium on which a program recorded thereon for causing a computer to function as the anomaly detection apparatus according to claim 1.

* * * * *